(12) United States Patent
Zhang et al.

(10) Patent No.: US 8,483,035 B2
(45) Date of Patent: Jul. 9, 2013

(54) THERMALLY ASSISTED MAGNETIC RECORDING HEAD INSPECTION METHOD AND APPARATUS

(75) Inventors: Kaifeng Zhang, Yokohama (JP); Takenori Hirose, Tokyo (JP); Masahiro Watanabe, Yokohama (JP); Shinji Homma, Nakai (JP); Tsuneo Nakagomi, Nakai (JP); Teruaki Tokutomi, Odawara (JP); Toshihiko Nakata, Hiratsuka (JP); Takehiro Tachizaki, Yokohama (JP)

(73) Assignee: Hitachi High-Technologies Corporation, Tokyo (JP)

( * ) Notice: Subject to any disclaimer, the term of this patent is extended or adjusted under 35 U.S.C. 154(b) by 0 days.

(21) Appl. No.: 13/482,065

(22) Filed: May 29, 2012

(65) Prior Publication Data

US 2012/0307605 A1    Dec. 6, 2012

(30) Foreign Application Priority Data

May 30, 2011    (JP) ................................. 2011-119881

(51) Int. Cl.
     *G11B 7/00*      (2006.01)
     *G11B 5/09*      (2006.01)

(52) U.S. Cl.
     USPC ..................... 369/126; 369/13.26; 360/324.2; 360/114.01

(58) Field of Classification Search
     None
     See application file for complete search history.

(56) References Cited

U.S. PATENT DOCUMENTS

| | | | |
|---|---|---|---|
| 6,437,562 B2 * | 8/2002 | Abe | 324/210 |
| 6,950,385 B1 * | 9/2005 | Chiba et al. | 369/126 |
| 2010/0061002 A1 | 3/2010 | Nakagomi et al. | |
| 2010/0064396 A1 | 3/2010 | Nakata et al. | |
| 2010/0205699 A1 * | 8/2010 | Tachizaki et al. | 850/47 |
| 2010/0325761 A1 | 12/2010 | Nakata et al. | |

FOREIGN PATENT DOCUMENTS

| | | |
|---|---|---|
| JP | 2009-230845 A | 10/2009 |
| JP | 2009-236895 A | 10/2009 |
| JP | 2012-58263 A | 3/2012 |

\* cited by examiner

*Primary Examiner* — Muhammad N Edun
(74) *Attorney, Agent, or Firm* — Crowell & Moring LLP

(57) ABSTRACT

In a method and an apparatus for inspecting a thermally assisted magnetic recording head element, a specimen is mounted on a table movable in a plane of a scanning probe microscope device, evanescent light is generated from a portion of light emission of evanescent light of the specimen, scattered light of the evanescent light is detected by moving the table in the plane while a cantilever of the scanning probe microscope having a probe is vertically vibrated in the vicinity of a surface of the specimen, and an intensity distribution of the evanescent light emitted from the portion of light emission of evanescent light or a surface profile of the portion of light emission of evanescent light of the specimen is inspected using position information of generation of the evanescent light based on the detected scattered light.

11 Claims, 12 Drawing Sheets

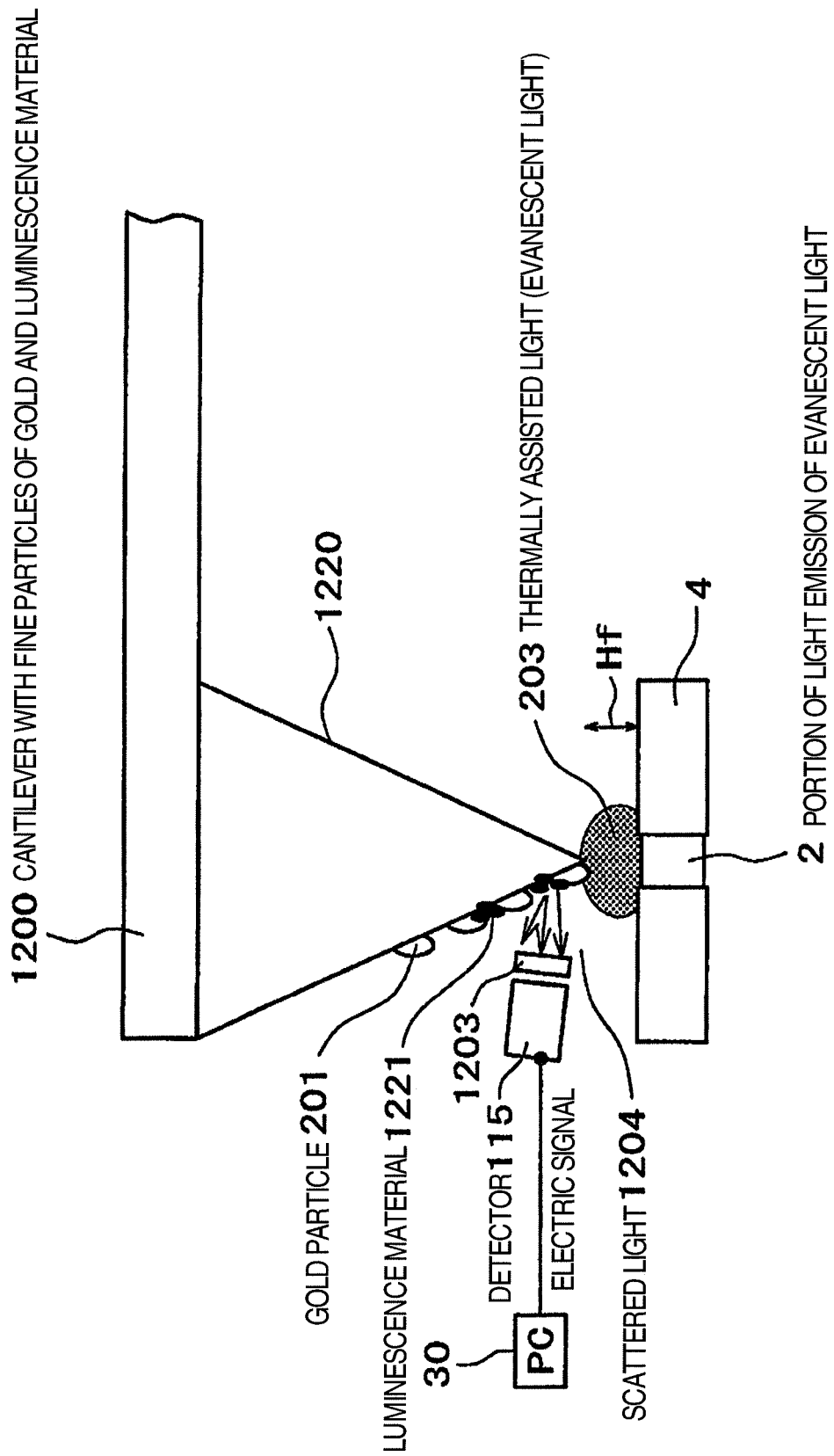

THERMALLY ASSISTED MAGNETIC RECORDING HEAD INSPECTION METHOD AND APPARATUS

INCORPORATION BY REFERENCE

The present application claims priorities from Japanese applications JP2011-119881 filed on May 30, 2011 and JP2012-116362 filed on May 22, 2012, the contents of which are hereby incorporated by reference into this application.

BACKGROUND OF THE INVENTION

The present invention relates to thermally assisted magnetic recording head inspection methods and apparatuses for inspecting a thin-film thermally assisted magnetic recording head as well as methods for manufacturing a thermally assisted magnetic recording head, and more particularly, a thermally assisted magnetic recording head inspection method and an apparatus of the same which can inspect the state of evanescent light generated by a thin-film thermally assisted magnetic recording head, which can not be inspected with use of a technique using an optical microscope or the like, and a method of manufacturing such a thermally assisted magnetic recording head.

As a next-generation hard disc drive head, it is planned by many hard disc manufacturers to employ a thermally assisted magnetic recording head. The width of evanescent light generated by the thermally assisted magnetic recording head is not larger than 20 nm and the width determines the width of a write track in the hard disc. Methods for inspecting an intensity distribution of the evanescent light in actual operation and the physical shape of the portion of light emission are unsolved yet important problems. Currently, it is possible to measure the shape of a head (element) using a scanning electron microscope (SEM); but it is a destructive inspection and it is difficult to apply to a total inspection for mass production.

Meanwhile, the conventional track width inspection of a magnetic head for hard disc use has been carried out in a final step of magnetic head manufacture called HGA (Head Gimbal Assembly) state or pseudo HGA state. In order to meet such demands as improvement in a production cost or early stage feedback of manufacturing process conditions, a method for inspecting magnetic recording heads in the form of a rowbar cut from a wafer is disclosed in JP-A-2009-230845.

SUMMARY OF THE INVENTION

There is no such an inspection apparatus as to be exclusive for the purpose of inspection of evanescent light generated by a head or inspection of the physical shape of a portion of light emission of evanescent light yet in the world. Currently, for inspection of performances of a magnetic head an inspection apparatus for the form of a rowbar cut from a wafer is used; it is necessary to develop an inspection apparatus which inspects even a thermally assisted magnetic recording head in the early stage of manufacturing such as in the form of a rowbar as well.

In view of the above problems, the present invention provides a thermally assisted magnetic recording head inspection method and an apparatus of the same which can inspect evanescent light generated by a thermally assisted magnetic recording head or the physical shape of a portion of light emission of evanescent light at a stage as early as possible in course of the manufacturing steps and also a method for manufacturing the thermally assisted magnetic recording head.

In order to solve a problem described above, in the present invention an inspection apparatus for inspecting a thermally assisted magnetic recording head element is configured to include a table unit movable in a place having a thermally assisted magnetic recording head element as a specimen mounted thereon; a cantilever having a probe on a surface for scanning a surface of the specimen mounted on the table unit; a vibration driving unit for vibrating the cantilever vertically with respect to the surface of the specimen; a displacement detecting unit for detecting vibration of the cantilever by irradiating light onto a surface of the cantilever vibrated by the vibration driving unit which is opposed to the surface of the cantilever having the probe and by detecting light reflected from the cantilever; a signal output unit for outputting a signal to generate evanescent light from a portion of light emission of evanescent light of the thermally assisted magnetic recording head element; a scattered light detecting unit for detecting scattered light generated from a surface of the cantilever when the probe of the cantilever enters a region of emission of evanescent light generated from the portion of light emission of evanescent light of the thermally assisted magnetic recording head element by a signal output from the signal output unit; and a processing unit for determining whether the state of generation of evanescent light generated from the portion of light emission of evanescent light of the thermally assisted magnetic recording head element is good or bad using position information of the table unit having the specimen mounted thereon and a signal obtained by detecting the scattered light with the scattered light detecting unit.

Also, in order to solve a problem described above, in the present invention there is provided a method for inspecting a thermally assisted magnetic recording head element which includes the steps of mounting a thermally assisted magnetic recording head element as a specimen on a table movable in a plane of a scanning probe microscope device; generating evanescent light from a portion of light emission of evanescent light of the specimen; detecting scattered light of the evanescent light generated from the thermally assisted magnetic recording head element by moving the table in the plane while a cantilever of the scanning probe microscope having a probe is vertically vibrated in the vicinity of a surface of the specimen; and inspecting an intensity distribution of the evanescent light emitted from the portion of light emission of evanescent light or a surface profile of the portion of light emission of evanescent light of the thermally assisted magnetic recording head element formed in a rowbar using position information of generation of the evanescent light based on the detected scattered light.

The present invention has an advantage that an intensity distribution of evanescent light generated by the thermally assisted magnetic recording head or the physical shape of the portion of light emission of evanescent light can be inspected on a non-destructive basis at a stage as early as possible in the course of manufacturing steps.

These and other objects, features, and advantages of the invention will be apparent from the following more particular description of preferred embodiments of the invention, as illustrated in the accompanying drawings.

BRIEF DESCRIPTION OF THE DRAWINGS

FIG. 12 is a side view of an enlargement of a probe provided at the tip end portion of a cantilever and a portion of generation of thermally assisted light of a recording head in the fifth embodiment of the thermally assisted magnetic recording head inspection apparatus according to the present invention.

DESCRIPTION OF THE EMBODIMENTS

Figure 1:
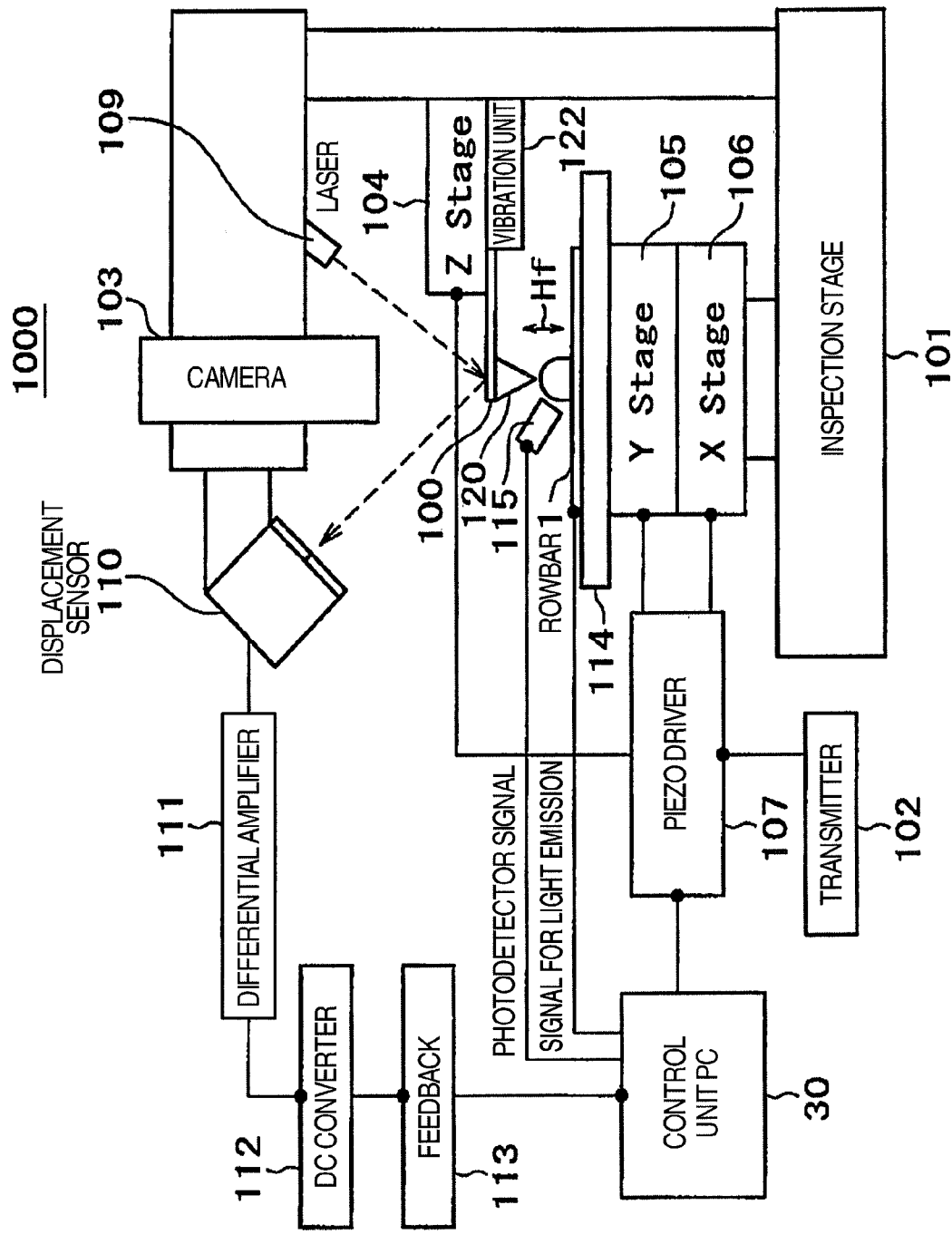
FIG. 1 is a block diagram showing a schematic arrangement of a first embodiment of a thermally assisted magnetic recording head inspection apparatus according to the present invention.

When the state of generation of evanescent light generated at a portion of light emission of evanescent light of a thermally assisted magnetic recording head element is inspected, it is difficult to directly detect the evanescent light since the region of generation of the evanescent light generated at the portion of light emission of evanescent light is limited to a very close vicinity of the portion of light emission of evanescent light. Therefore, in the present invention it is designed to detect the state of generation of the evanescent light at the portion of light emission of evanescent light of the thermally assisted magnetic recording head element with scattered light generated from the probe of a cantilever of a scanning probe microscope entering the region of generation of the evanescent light at a place relatively apart from the region of generation of the evanescent light.

In addition, modifications of the above embodiments are designed to detect scattered light generated from the portion of light emission of evanescent light by generating the evanescent light at the probe.

Embodiments of the present invention including the above modifications are explained in detail by referring to the drawings hereinafter.

Embodiment 1

FIG. 1 is a block diagram of a basic configuration of a first embodiment of a thermally assisted magnetic recording head inspection apparatus according to the present invention. The thermally assisted magnetic recording head inspection apparatus 1000 of FIG. 1 can measure an intensity distribution of evanescent light generated by the thermally assisted magnetic recording head in the form of a rowbar (a block with head sliders arranged therein) in a process prior to cutting out individual sliders (chips). A rowbar cut out from a wafer in the form of an elongated block body having a length of about 3-5 cm has usually a configuration of about 40-90 of head sliders arranged therein. A TAMR head inspection apparatus according to the present embodiment is configured to perform predetermined inspection with a rowbar 1 as a work. Usually about 20-30 of the rowbars 1 are arranged and stored in a not-illustrated tray at an interval of a predetermined spacing in a short-axis direction. A handling robot not illustrated takes out the rowbars 1 one by one from the not-illustrated tray and transfers them to an inspection stage 101. The rowbar 1 transferred to and mounted on the inspection stage 101 is inspected in such a manner as to be explained below.

The inspection stage 101 has an X stage 106 and a Y stage 105, which can move the rowbar 1 in the X and Y directions. The rowbar 1 is positioned by once abutting its one side surface in the long-axis direction against a reference surface of the Y stage 105. A mounting portion 114 for position of the rowbar 1 is provided on the top surface of the Y stage 105. A step portion nearly conforming to the shape of the rowbar 1 is provided in a side edge portion of the top surface of the mounting portion 114. The rowbar 1 is arranged to be placed at a predetermined position by being abutted against bottom and side surfaces of the step portion. A rear side face of the rowbar 1 (the opposite face to a surface having various connecting terminals of the TAMR head) is abutted against a rear surface of the step portion. Each of the abutting surfaces is parallel to the moving direction (X axis) of the X stage 106 and to the moving direction (Z axis) of a Z stage 104, respectively, and has a reference surface which is in an orthogonal positional relationship thereto; thus, positionings in the X direction and in the Z direction are achieved when the rowbar 1 is mounted to be abutted against the bottom and side surfaces of the step portion of the Y stage 105.

A camera 103 for measurement of the amount of positional displacement is provided above the Y stage 105. The Z stage 104 is to move a cantilever portion 100 of a scanning near field optical microscope (SNOM) in the Z direction. The X stage 106, the Y stage 105, and the Z stage 104 of the inspection stage 101 are formed with piezo stages, respectively. After a predetermined positioning is completed, the rowbar 1 is provided with a recording signal (a signal for light emission) output from a control unit PC 30 or with laser light for excitation directly, so that the portion of light emission of the thermally assisted magnetic recording head on the rowbar 1 can emit evanescent light. Then, the rowbar 1 adheres to the mounting portion 114.

A piezo driver 107 is to drive and control each of the X stage 106, the Y stage 105, and the Z stage 104 (piezo stages) of the inspection stage 101. The control unit PC 30 is configured with a computer for control with a personal computer (PC) including a display as a basic configuration. As illustrated in the figure, at an opposing position above the rowbar 1 mounted on the mounting portion 114 on the Y stage 105 of the inspection stage 101 the cantilever portion 100 with a sharp-pointed probe 120 formed to render a free end is arranged, to which a fine particle or a thin film of a noble metal (such as gold or silver, for example) or of an alloy containing a noble metal is added. The cantilever portion 100 is installed to a vibration unit 122 provided on the lower side of the Z stage 104. The vibration unit 122 is configured with a piezo element; an AC voltage having a frequency near a mechanical resonance frequency is applied as an exciting voltage from the piezo driver 107 so that the probe 120 is vertically vibrated.

A displacement detecting unit is configured with a semiconductor laser element 109 and a displacement sensor 110 constituting a tetrameric photodetector element. Light emitted from the semiconductor laser element 109 is irradiated onto the cantilever portion 100 and light reflected by the cantilever portion 100 is guided into the displacement sensor 110. A differential amplifier 111 applies predetermined calculating operation on a differential signal of 4 signals output from the displacement sensor 110 and to output to a DC converter 112. Namely, the differential amplifier 111 outputs a displacement signal corresponding to the differences of the 4 signals output from the displacement sensor 110 to the DC converter 112. Accordingly, when the cantilever portion 100 is not vibrated by the vibration unit 122, the output of the differential amplifier 111 becomes zero. The DC converter 112 is configured with an RMS-DC converter (Root Mean Squared value to Direct Current Converter) which converts the displacement signal output from the differential amplifier 111 to a DC signal of an effective value.

The displacement signal output from the differential amplifier 111 is a signal depending on a displacement of the cantilever portion 100 and, since the cantilever portion 100 is vibrated, it becomes an AC signal. A signal output from the DC converter 112 is input to a feedback controller 113. The feedback controller 113 outputs a signal input from the DC converter 112 to the control unit PC 30 as a signal for monitoring the amplitude of the current vibration of the cantilever portion 100 and also outputs a signal input from the DC converter 112 via the control unit PC 30 to the piezo driver 107 as a signal for control of the Z stage 104 to adjust the amplitude of excitation of the cantilever portion 100. By monitoring the signal with the control unit PC 30 and controlling a piezo element (not shown) to drive the Z stage 104 with the piezo driver 107 according to its value, the initial position of the cantilever portion 100 is adjusted before starting measurement. In this embodiment, a flying height of a head of a hard disk drive is set as the initial position of the cantilever portion 100.

A transmitter 102 supplies an oscillation signal to the piezo driver 107 in order to excite the cantilever portion 100. The piezo driver 107 drives the vibration unit 122 based on the oscillation signal from the transmitter 102 to vibrate the cantilever portion 100 at a predetermined frequency.

Figure 2:
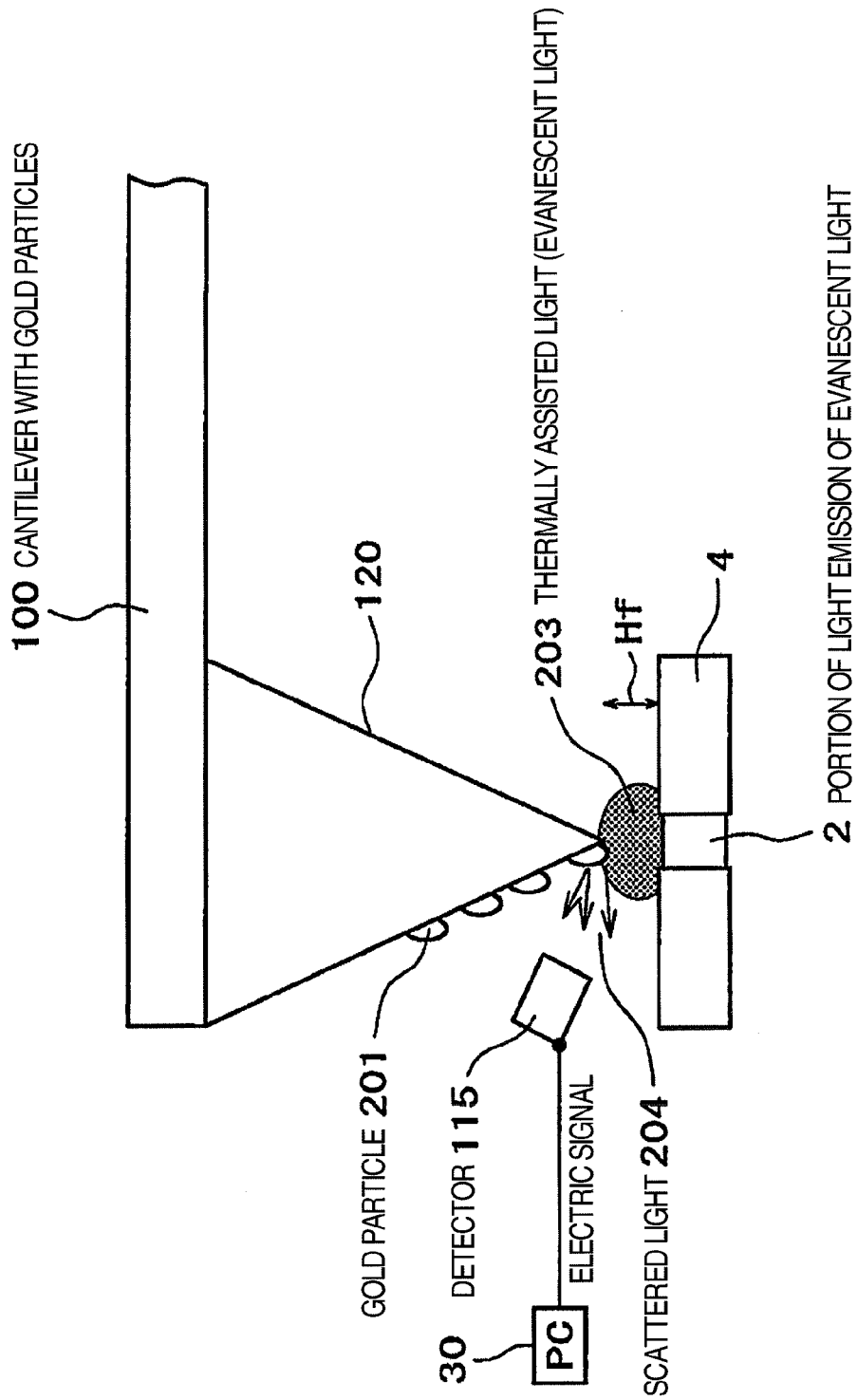
FIG. 2 is a side view of an enlargement of a probe provided at the tip end portion of a cantilever and a portion of generation of thermally assisted light of a recording head in the first embodiment of the thermally assisted magnetic recording head inspection apparatus according to the present invention.

FIG. 2 is a diagram schematically showing a principle of detecting evanescent light with the thermally assisted magnetic recording head inspection apparatus of FIG. 1; it is a diagram showing an enlargement of a configuration of a portion of light emission of thermally assisted light (evanescent light) 2 of a thermally assisted magnetic recording head element 4 formed in the rowbar 1 along with the cantilever portion 100.

As shown in FIG. 2, the cantilever portion 100 is positioned by the Z stage 104 so that a lowest point Hf of vibration is between a position in contact with the surface of the thermally assisted magnetic recording head element 4 formed in the rowbar 1 and a position (height) several tens of nm away and the tip end portion of the probe 120 of the cantilever portion 100 attached with a fine particle or a thin film of a noble metal (such as gold or silver, for example) or of an alloy containing a noble metal is located at such a height that a magnetic field signal and a detection signal of the evanescent light from the thermally assisted magnetic recording head element 4 can be detected at greatest strengths with good resolutions. The cantilever portion 100 scans in a plane parallel to a recording surface of a head in the rowbar 1 within a range of several hundreds of nm to several μm.

In the present embodiment, the rowbar 1 is moved by the X stage 106 and the Y stage 105. At this time, the thermally assisted magnetic recording head element 4 is supplied with a recording signal (a signal for light emission) output from the control unit PC 30 in FIG. 1 or with laser light for excitation directly so that the portion of light emission of evanescent light 2 of the thermally assisted magnetic recording head element 4 emits thermally assisted light (evanescent light) 203. When the probe 120 of the cantilever portion 100 enters a region where the thermally assisted light (evanescent light) 203 is generated, scattered light 204 is created from the probe 120 due to the evanescent light 203 and the scattered light 204 can be detected with a photodetector 115. When the probe 120 is located within the range of generation of the evanescent light, a fine particle 201 or a thin film of a noble metal (such as gold or silver, for example) or of an alloy containing a noble metal formed on the surface of the probe 120 receives the evanescent light and generates the scattered light 204 enhanced by a localized surface plasmon enhancement effect.

Since the scattered light 204 is proportional in the intensity to the evanescent light 203, by processing a detection signal of the scattered light 204 detected by the detector 115 with the control unit PC 30 the state of generation of the evanescent light 203 generated from the portion of light emission of evanescent light 2 and an intensity distribution of the evanescent light 203 can be obtained (estimated). By comparing the obtained state of generation of the evanescent light 203 or the intensity distribution of the evanescent light with preset reference data, it can be determined whether the state of light emission of the evanescent light from the portion of light emission of evanescent light 2 is good or bad. In this way, inspection of the evanescent light generated by the recording head of the thermally assisted magnetic recording head becomes possible and an advantageous effect arises that the intensity distribution of the evanescent light of the thermally assisted magnetic recording head can be inspected at a stage as early as possible in the course of manufacturing steps.

Figure 9:
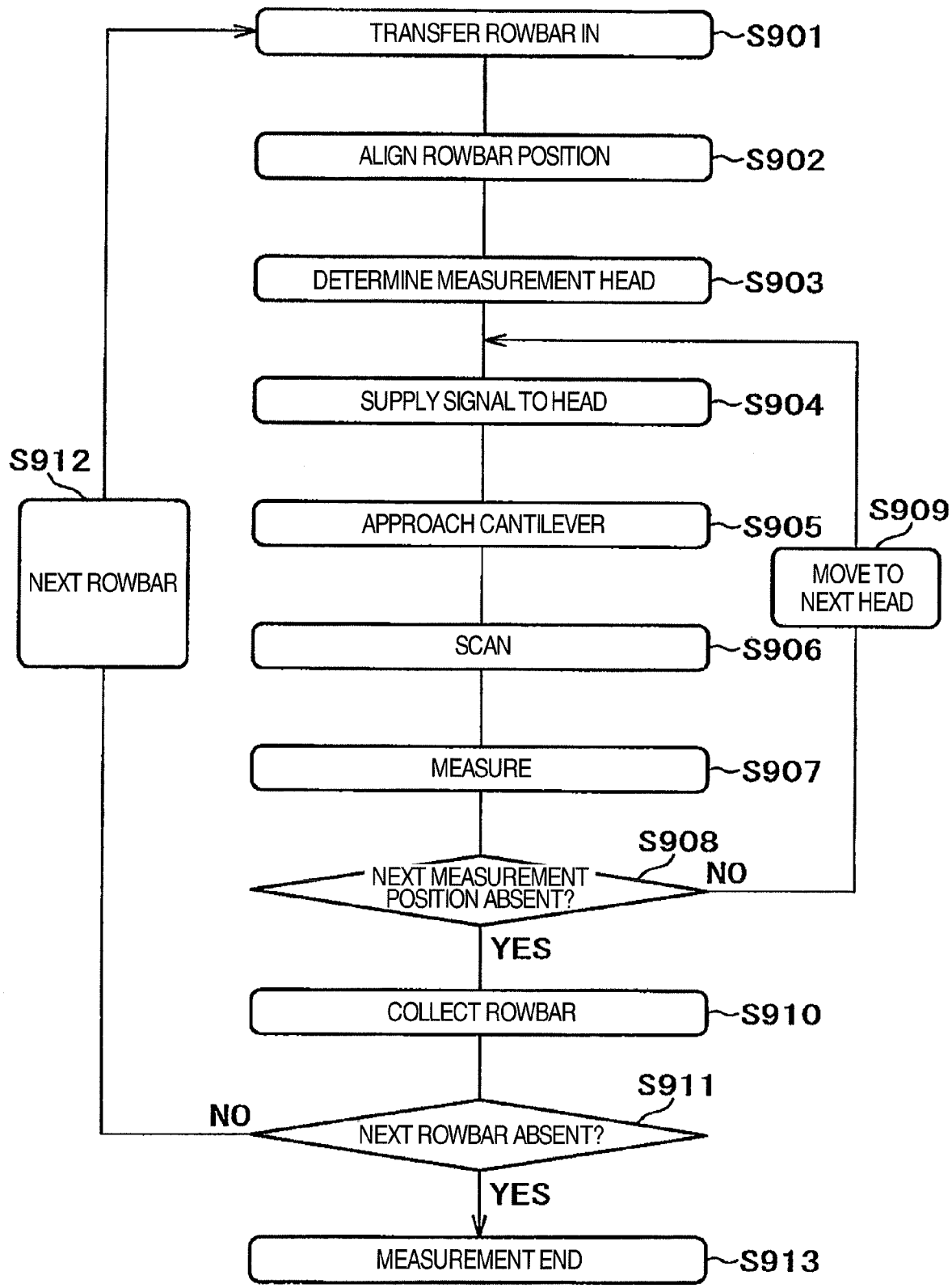
FIG. 9 is a flow chart showing a procedure of operation in the first, third, and fifth embodiments of the thermally assisted magnetic recording head inspection apparatuses according to the present invention.

FIG. 9 is a flow chart showing a procedure of operation in the aforementioned thermally assisted magnetic recording head inspection apparatus. First of all, a plurality of installed rowbars are taken out one by one and transferred onto the inspection stage (step S901), subjected to alignment with a camera (step S902), a thermally assisted magnetic recording head element 4 (head to be measured) formed in the rowbar is moved to a measurement position, and the head to be measured is positioned (step S903). Next, a recording signal (a signal for light emission) or laser light for excitation is supplied to the head to be measured (step S904) and the Z stage 104 is controlled by the piezo driver 107 so that the probe 120 of the cantilever portion 100 approaches the recording surface of the head to be measured (step S905). Then, the vibration unit 122 is driven by the piezo driver 107 based on an oscillation signal from the transmitter 102 to vibrate the cantilever portion 100 at a predetermined frequency. In this condition, by driving the Y stage 105 and the X stage 106 with the piezo driver 107 to move the rowbar 1 in the XY plane the cantilever portion 100 scans the plane parallel to the recording surface of the head in a range of several hundreds of nm to several μm (step S906) so that scattered light from the probe 120 generated by the evanescent light created by the recording head can be detected and an intensity distribution thereof is measured (step S907). Next, the cantilever is moved up and whether there exists a head to be measured next in the rowbar 1 is examined (step S908); when there exists, the next head to be measured is moved under the cantilever (step S909) and the operations of the step S904 and down are performed. When there are no heads to be measured next in the rowbar 1, the rowbar 1 completed with measurement is extracted out by a not-shown handling unit to store in a collection tray while the cantilever portion 100 is kept lifted by the Z stage 104 (step S910). It is next examined whether or not a rowbar not inspected yet is present in a not-shown supply tray (step S911); when there is a rowbar not inspected yet, the rowbar not inspected yet is taken out from the supply tray (not shown) (step S912) and transferred to the inspection stage 101 to execute the steps from the step S901. When a rowbar to be inspected is not present in the supply tray, on the other hand, measurement is finished (step S913).

In the above embodiment, incidentally, explanation has been made in connection with inspection in the form of the rowbar 1; however, the present embodiment is not limited thereto and inspection similar to the one described above may be carried out with individual sliders (not shown) cut out from the rowbar 1 being mounted on the mounting portion 114.

Embodiment 2

A second embodiment of the present invention is explained in detail while referring to the drawings.

Figure 3:
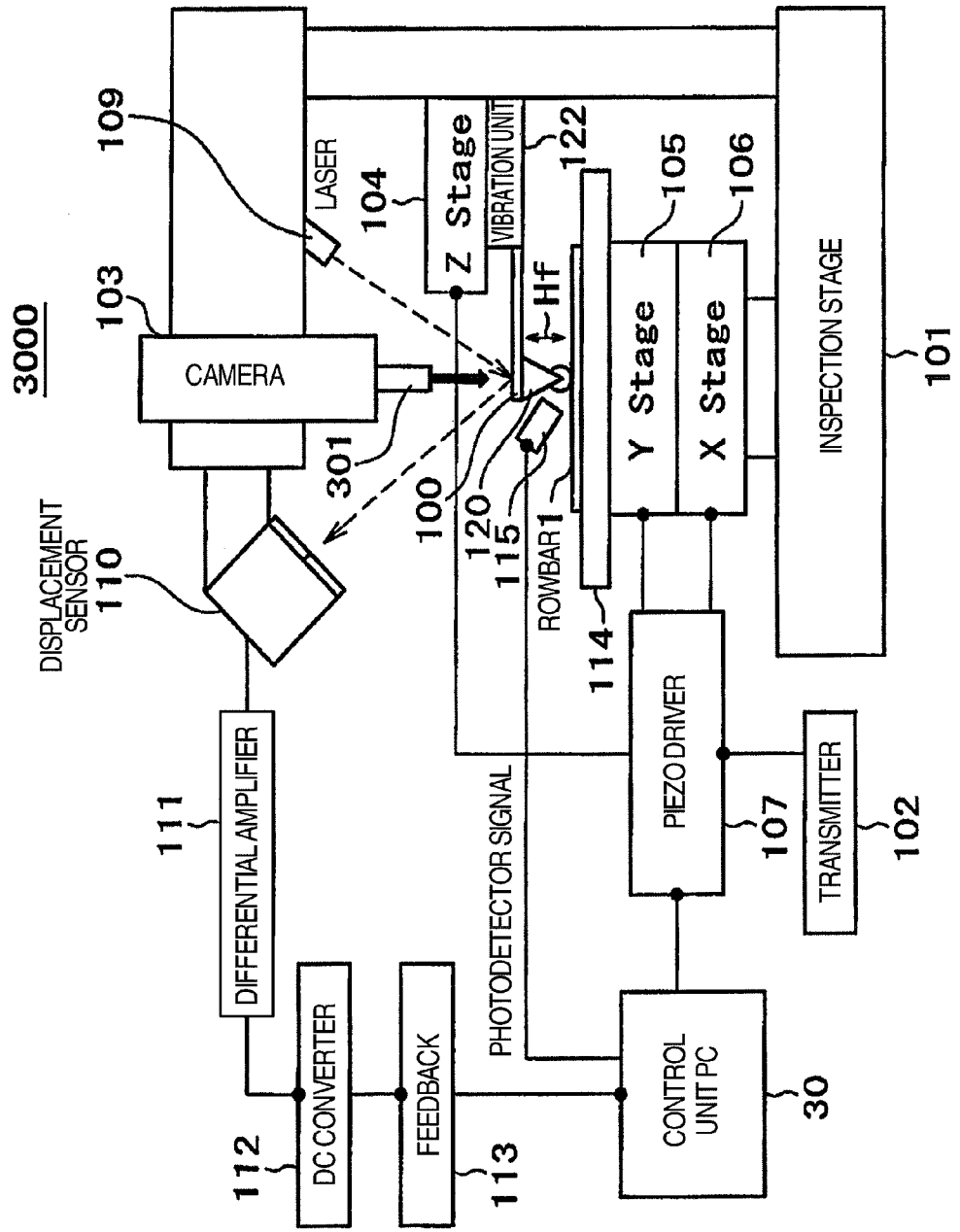
FIG. 3 is a block diagram showing a schematic arrangement of a second embodiment of a thermally assisted magnetic recording head inspection apparatus according to the present invention.

FIG. 3 is a block diagram of a basic configuration of a second embodiment of a thermally assisted magnetic recording head inspection apparatus according to the present invention. A thermally assisted magnetic recording head inspection apparatus 3000 of FIG. 3, like Embodiment 1, measures the physical shape of a portion of light emission of evanescent light of a thermally assisted magnetic recording head element 4 in the form of a rowbar 1 prior to individual sliders (chips) being cut out therefrom.

In the configuration of the thermally assisted magnetic recording head inspection apparatus 3000 of FIG. 3, the same constituents as those in the configuration of the thermally assisted magnetic recording head inspection apparatus 1000 explained for Embodiment 1 shown in FIG. 1 are denoted by the same reference numerals. The inspection stage 101, the piezo driver 107, the displacement detecting unit configured with the semiconductor laser element 109 and the displacement sensor 110, the differential amplifier 111, and the like are already explained in connection with the thermally assisted magnetic recording head inspection apparatus 1000 in Embodiment 1 and thus explanation thereof is omitted.

The present embodiment is different from Embodiment 1 in the configuration where evanescent light is generated by the probe 120 provided at the tip end of the cantilever portion 100 and scattered light generated from the portion of light emission of evanescent light 2 of the thermally assisted magnetic recording head element 4 is detected.

Namely, as shown in FIG. 3, the present embodiment is configured so that a laser element 301 is installed over the cantilever portion 100 in order to cause a fine particle or a thin film of a noble metal (such as gold or silver, for example) or of an alloy containing a noble metal attached to the probe 120 at the tip end of the cantilever portion 100 to emit the evanescent light and laser light emitted from the laser element 301 is irradiated onto the tip end portion of the cantilever portion 100 so that the evanescent light is generated by the probe 120.

Figure 4:
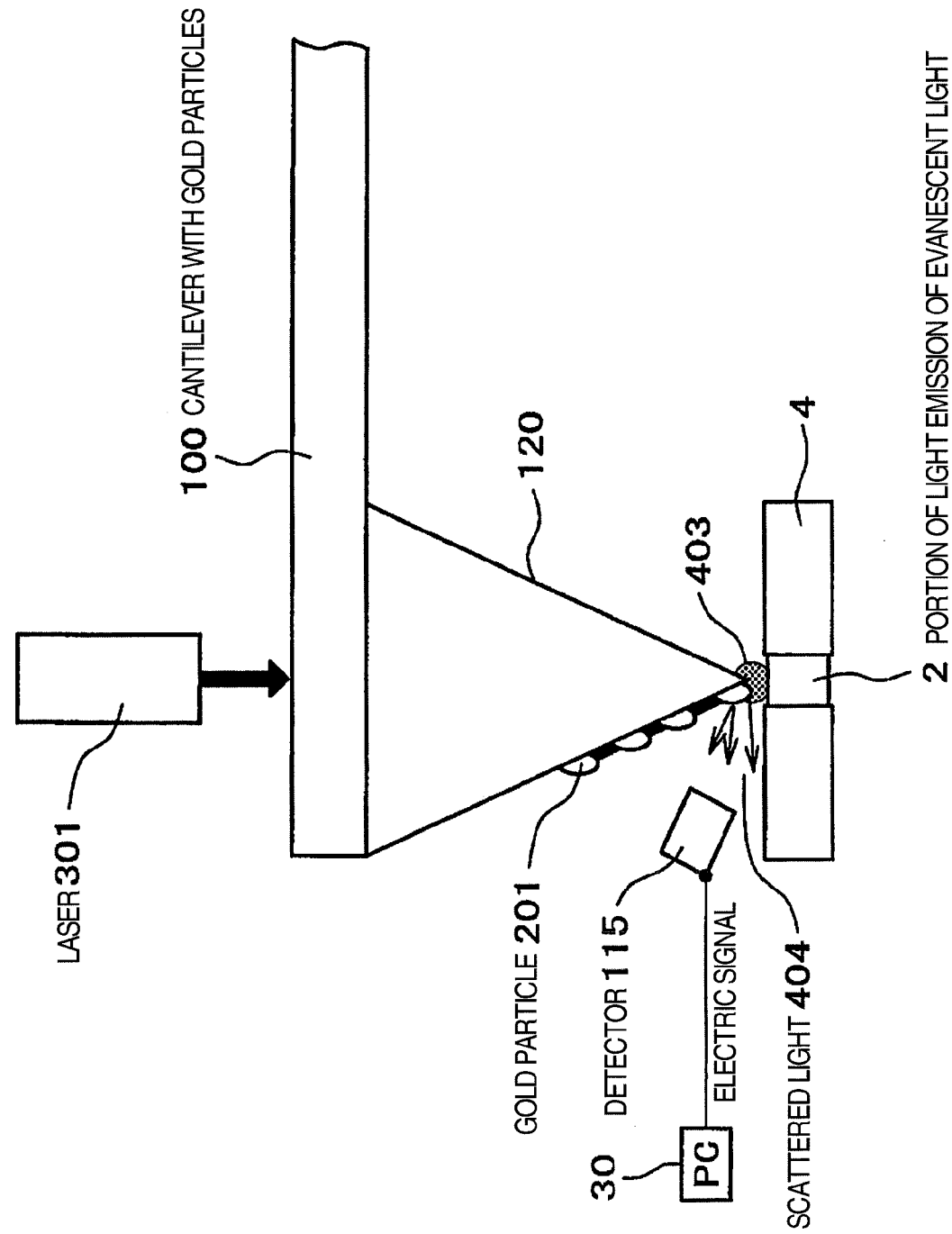
FIG. 4 is a side view of an enlargement of a probe provided at the tip end portion of a cantilever and a portion of generation of thermally assisted light of a recording head in the second embodiment of the thermally assisted magnetic recording head inspection apparatus according to the present invention.

FIG. 4 is a diagram schematically showing a principle of detecting the physical shape of the portion of light emission of evanescent light with the thermally assisted magnetic recording head inspection apparatus 3000 of FIG. 3, also showing an enlargement of the configuration of the portion of light emission of thermally assisted light (evanescent light) 2 of the thermally assisted magnetic recording head element 4 formed in the rowbar 1 along with the cantilever portion 100. As shown in FIG. 4, the cantilever portion 100 is positioned by the Z stage 104 so that the tip end portion of the probe 120 of the cantilever portion 100 is located at a position apart by Hf from the surface of the thermally assisted magnetic recording head element 4 formed in the rowbar 1. In a manner similar to that explained in Embodiment 1, the cantilever portion 100 scans in a plane parallel to the recording surface of the head in the rowbar 1 within a range of several hundreds of nm to several μm. Here, since the laser element 301 is directed onto the cantilever portion 100 from above, evanescent light 403 is generated from a fine particle or a thin film 201 of a noble metal (such as gold or silver, for example) or of an alloy containing a noble metal formed at the tip end of the probe 120. As the cantilever portion 100 is vibrated by being driven by the vibration unit 122, the portion of light emission of evanescent light 2 of the recording head 4 and a vicinity thereof enter the region of generation of the evanescent light 403 generated by the probe 120 and scattered light 404 is generated from the portion of light emission of evanescent light 2. The scattered light 404 generated from the portion of light emission of evanescent light 2 can be detected by the photodetector 115. Since the intensity of the evanescent light 403 generated by the probe 120 is constant, the scattered light 404 generated from the portion of light emission of evanescent light 2 reflects the physical shape of a surface of the portion of light emission of evanescent light 2. Accordingly, by processing a detection signal of the scattered light 404 detected by the photodetector 115 with the control unit PC 30, a distribution of intensity of the scattered light 404 generated from the portion of light emission of evanescent light 2 due to the evanescent light 403 generated by the probe 120 can be obtained. By comparing the obtained intensity distribution of the scattered light 404 with preset reference data, it can be determined whether the physical shape of the portion of light emission of evanescent light 2 is good or bad. In this way, inspection of the physical shape of the portion of light emission of evanescent light 2 of the thermally assisted magnetic recording head element 4 becomes possible and an advantageous effect arises that the physical shape of the portion of light emission of evanescent light of the thermally assisted magnetic recording head can be inspected at a stage as early as possible in the course of manufacturing steps.

Figure 10:
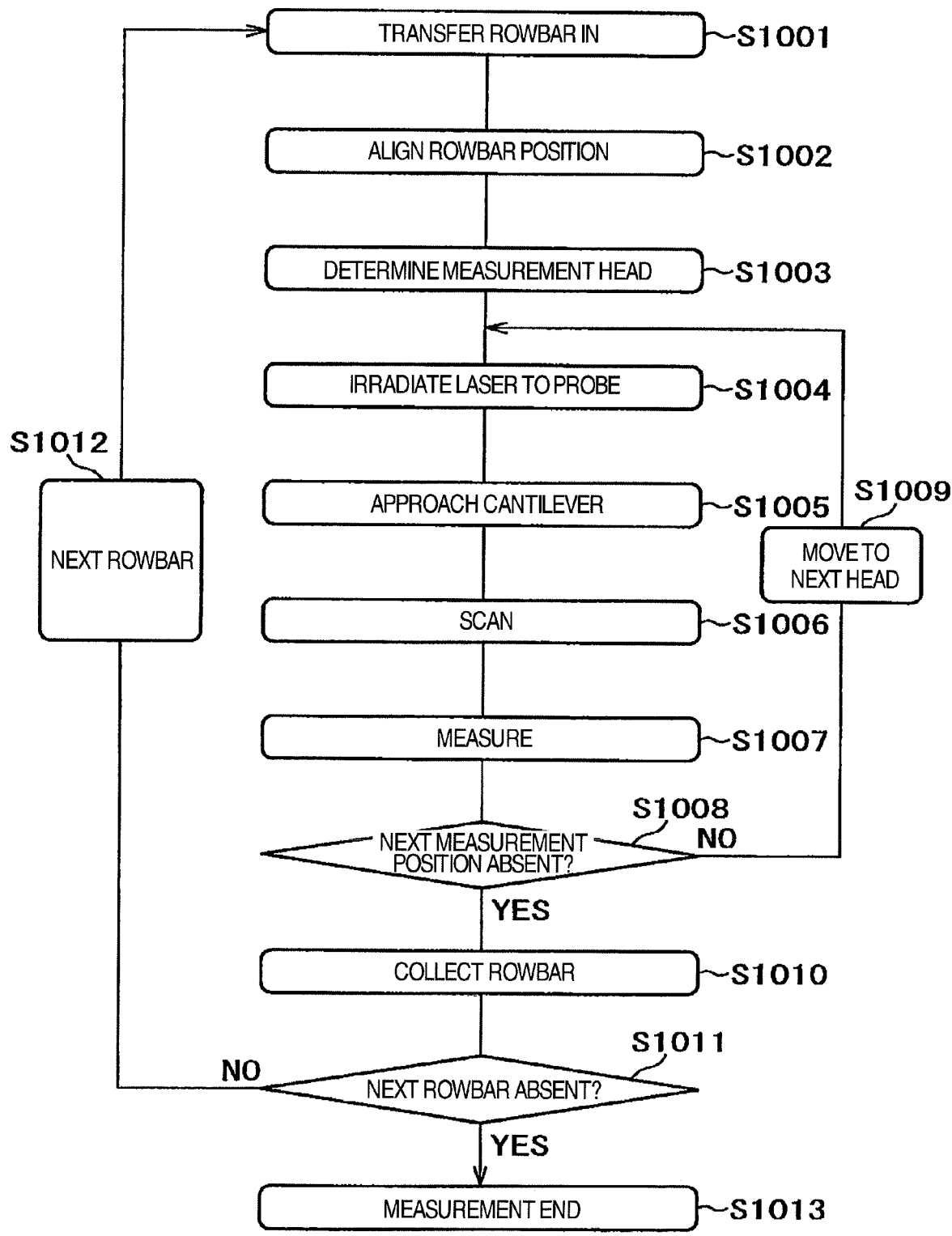
FIG. 10 is a flow chart showing a procedure of operation in the second and fourth embodiments of the thermally assisted magnetic recording head inspection apparatuses according to the present invention.

FIG. 10 is a flow chart showing a procedure of operation in the aforementioned thermally assisted magnetic recording head inspection apparatus. It is different from the flow chart explained in Embodiment 1 using FIG. 9 in that the step (S904) of supplying a head signal is replaced with a step (step S1004) of irradiating the probe with laser.

The flow in Embodiment 2 is explained by referring to FIG. 10. First of all, a plurality of installed rowbars are taken out one by one and transferred onto the inspection stage (step S1001), subjected to alignment with a camera (step S1002), the thermally assisted magnetic recording head element 4 (head to be measured) formed in the rowbar is moved to a measurement position, and the head to be measured is positioned (step S1003). Next, laser light is emitted from the semiconductor laser element 301 to irradiate the probe 120 formed at the tip end portion of the cantilever portion 100 with laser so that evanescent light is generated at the tip end portion of the probe 120 (step S1004); the Z stage 104 is controlled by the piezo driver 107 so that the probe 120 of the cantilever portion 100 approaches the recording surface of the head to be measured (step S1005). Then, the vibration unit 122 is driven by the piezo driver 107 based on an oscillation signal from the transmitter 102 to vibrate the cantilever portion 100 at a predetermined frequency. In this condition, by driving the Y stage 105 and the X stage 106 with the piezo driver 107 to move the rowbar 1 in the XY plane the cantilever portion 100 scans the plane parallel to the recording surface of the head in a range of several hundreds of nm to several μm (step S1006) so that an intensity distribution of the evanescent light generated by the recording head is detected and a length is measured (step S1007). Next, the cantilever is moved up and whether there exists a head to be measured next in the rowbar 1 is examined (step S1008); when there exists, the next head to be measured is moved under the cantilever (step S1009) and the operations of the step S1004 and down are performed. When there are no heads to be measured next in the rowbar 1, the rowbar 1 completed with measurement is extracted out by a not-shown handling unit to store in a collection tray while the cantilever portion 100 is kept lifted by the Z stage 104 (step S1010). It is next examined whether or not a rowbar not inspected yet is present in the not-shown supply tray (step S1011); when there is a rowbar not inspected yet, the rowbar not inspected yet is taken out from the supply tray (not shown) (step S1012) and transferred to the inspection stage 101 to execute the steps from the step S1001. When a rowbar to be inspected is not present in the supply tray, on the other hand, the measurement is finished (step S1013).

By mounting the laser element 301 of FIG. 3 to the camera 103 and not supplying a recording signal (a signal for light emission) output from the control unit PC 30 or laser light for excitation to the rowbar 1 in Embodiment 1, measurement of Embodiment 2 becomes possible.

Further, by supplying a recording signal (a signal for light emission) output from the control unit PC 30 or laser light for excitation directly to the rowbar 1 shown in FIG. 1 and causing the semiconductor laser element 301 not to emit light in Embodiment 2, measurement of Embodiment 1 becomes possible.

Explanation has been made in connection with the probe of the cantilever described in the above-mentioned Embodiments 1 and 2 having a pyramidal shape; the present invention is not limited thereto and as a probe one formed with a thin wire made of one selected from a group of silicon oxide, silicon nitride, high density carbon (HDC:DLC), carbon nano tube (CNT), carbon nano fiber (CNF), tungsten (W), or the like, which is different from that of the cantilever 100 made of material such as Si, SiO$_2$, or SiN, can be used.

Embodiment 3

A third embodiment of the present invention is explained in detail while referring to the drawings.

Figure 5:
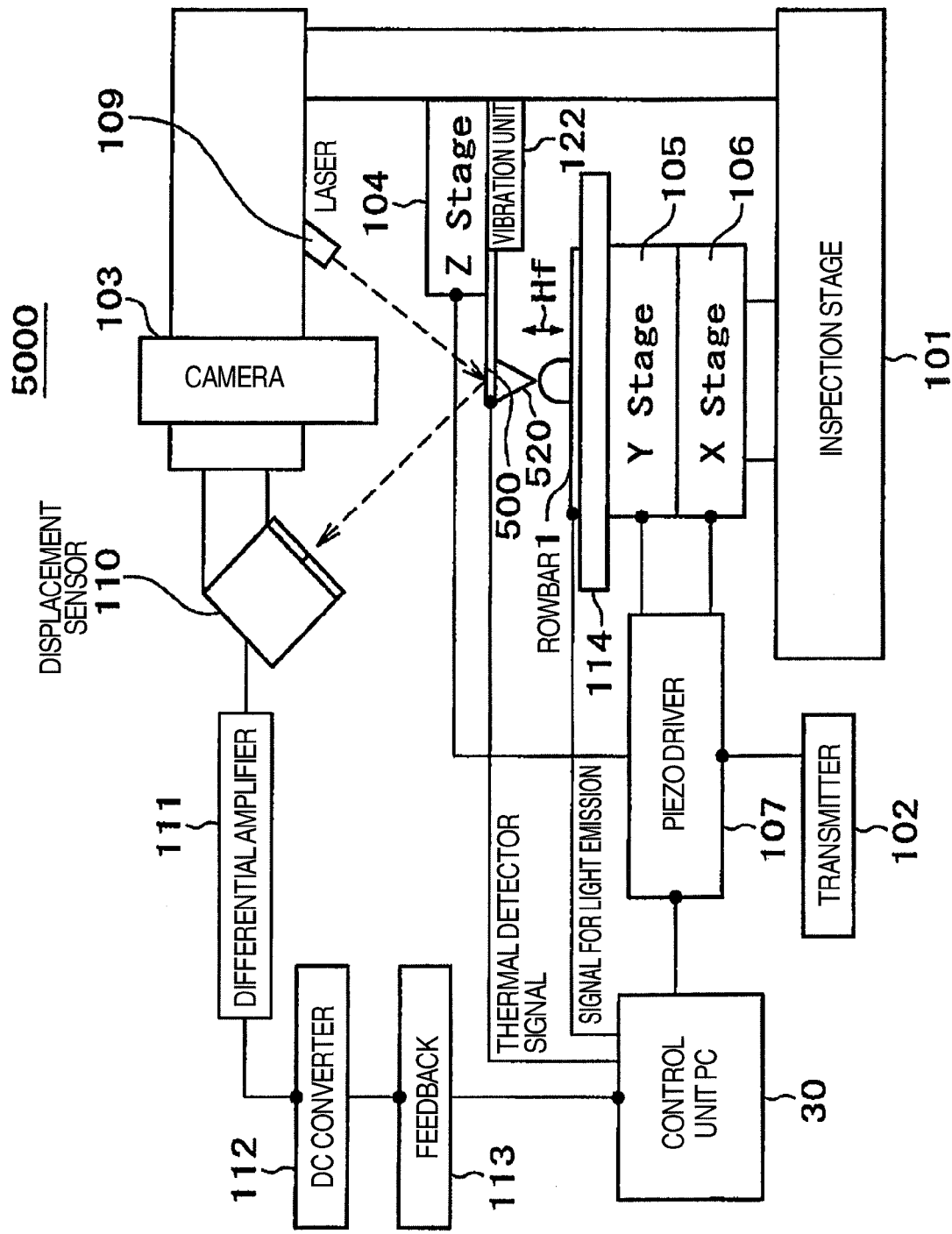
FIG. 5 is a block diagram showing a schematic arrangement of a third embodiment of a thermally assisted magnetic recording head inspection apparatus according to the present invention.

FIG. 5 shows a block diagram of a basic configuration of a third embodiment of a thermally assisted magnetic recording head inspection apparatus according to the present invention. A thermally assisted magnetic recording head inspection apparatus 5000 of FIG. 5, like Embodiments 1 and 2, measures an intensity distribution of evanescent light generated by a thermally assisted magnetic recording head element 4 in the form of a rowbar 1 prior to individual sliders (chips) being cut out therefrom.

In the configuration of the thermally assisted magnetic recording head inspection apparatus 5000 of FIG. 5, the same constituents as those in the configuration of the thermally assisted magnetic recording head inspection apparatus 1000 explained for Embodiment 1 shown in FIG. 1 are denoted by the same reference numerals. As for the constituents overlapping with those explained in connection with the thermally assisted magnetic recording head inspection apparatus 1000 of Embodiment 1, such as the inspection stage 101, the piezo driver 107, the displacement detecting unit configured with the semiconductor laser element 109 and the displacement sensor 110, and the differential amplifier 111, explanation is omitted.

In the present embodiment it is different from the aforementioned Embodiments 1 and 2 that heat generated in the portion of light emission of evanescent light 2 is detected by a probe 520 provided at the tip end of a cantilever 500 so that the state of the portion of light emission of evanescent light 2 of the thermally assisted magnetic recording head element 4 is inspected based on the distribution of the detected heat.

A camera 103 for measurement of the amount of positional displacement is provided above the Y stage 105. The Z stage 104 is to move a cantilever portion 500, to which a thermal sensor of a scanning thermal microscope (SThM) is attached, in the Z direction. The X stage 106, the Y stage 105, and the Z stage 104 of the inspection stage 101 are formed with piezo stages, respectively. After a predetermined positioning is completed, the rowbar 1 is provided with a recording signal (a signal for light emission) output from the control unit PC 30 or with laser light for excitation directly so that the rowbar 1 adheres to be held to the mounting portion 114.

The piezo driver 107 is to drive and control each of the X stage 106, the Y stage 105, and the Z stage 104 (piezo stages) of the inspection stage 101. The control unit PC 30 is configured with a computer for control with a personal computer (PC) including a display as a basic configuration. As illustrated in the figure, at an opposing position above the rowbar 1 mounted on the Y stage 105 of the inspection stage 101 the cantilever portion 500 with a thermal sensor such as a thermocouple or a thermal resistor at its tip end portion and with a sharp-pointed probe 520 being a free end is arranged. The cantilever portion 500 is installed to the vibration unit 122 provided on the lower side of the Z stage 104. The vibration unit 122 is configured with a piezo element; an AC voltage having a frequency near a mechanical resonance frequency is applied as an exciting voltage from the piezo driver 107 so that the magnetic probe is vertically vibrated.

Figure 6:
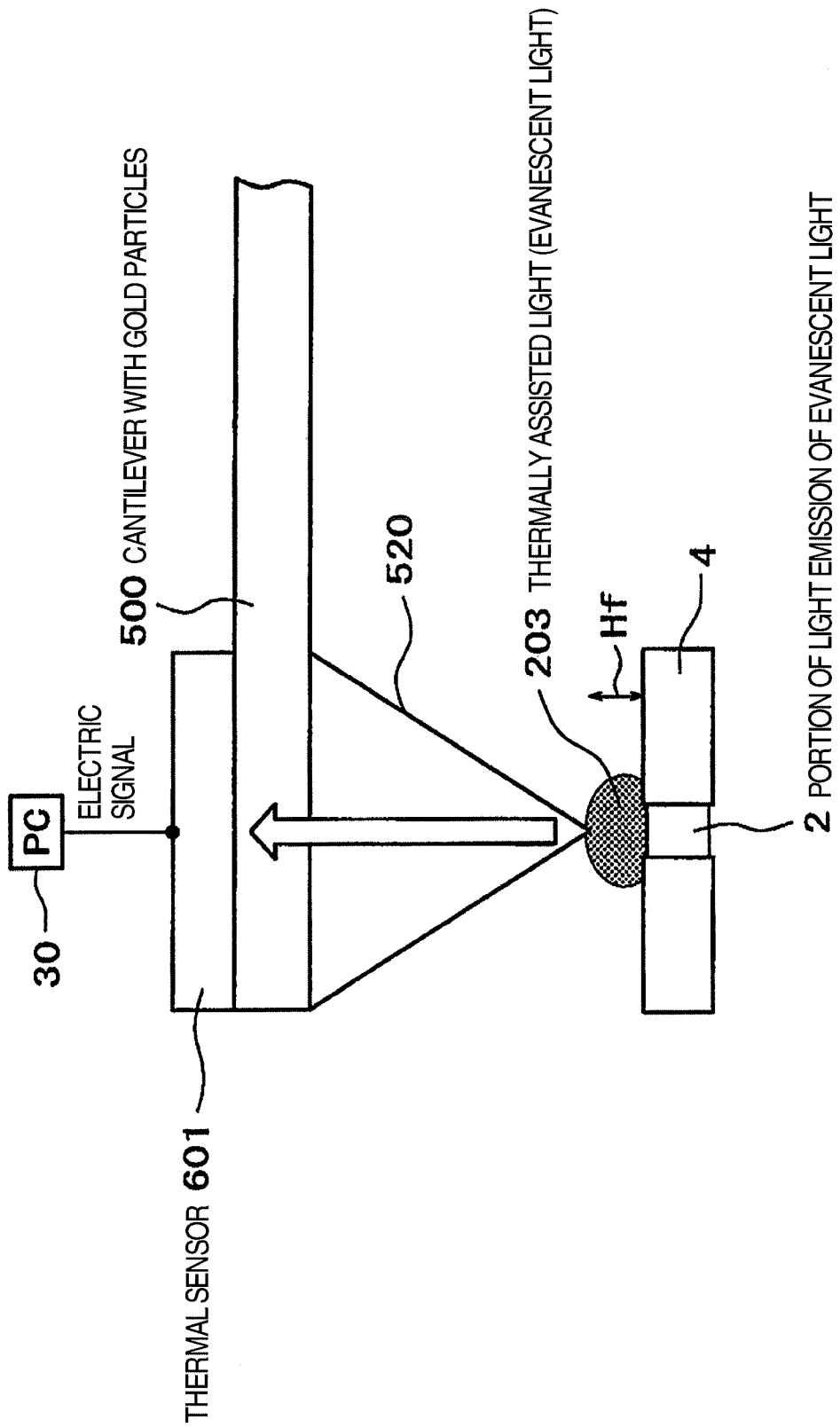
FIG. 6 is a side view of an enlargement of a probe provided at the tip end portion of a cantilever and a portion of generation of thermally assisted light of a recording head in the third embodiment of the thermally assisted magnetic recording head inspection apparatus according to the present invention.

FIG. 6 is a diagram schematically showing a principle of detecting evanescent light with the thermally assisted magnetic recording head inspection apparatus 5000 of FIG. 5; it is a diagram showing an enlargement of a configuration of the portion of light emission 2 of thermally assisted light (evanescent light) of the thermally assisted magnetic recording head element 4 formed in the rowbar 1 along with the thermal-sensor-added cantilever portion 500 to which a thermal sensor 601 is added.

As shown in FIG. 6, the thermal-sensor-added cantilever portion 500 is positioned by the Z stage 104 so that the tip end portion of the probe 520 to which a thermal sensor 601 such as a thermocouple or a thermal resistor is added at its tip end portion of the cantilever portion 500 is located at a height of Hf from the surface of the thermally assisted magnetic recording head element 4 formed in the rowbar 1 (at a position (height) away by several nm to several tens of nm from the surface of the thermally assisted magnetic recording head element 4). In a manner similar to that explained in Embodiment 1, the cantilever portion 500 scans in a plane parallel to the recording surface of the head in the rowbar 1 within a range of several hundreds of nm to several μm. Here, since the thermally assisted magnetic recording head element 4 is supplied with a recording signal (a signal for light emission) output from the control unit PC 30 of FIG. 5 or laser light for excitation directly so that thermally assisted light (evanescent light) 203 is emitted by the portion of light emission of evanescent light 2 of the thermally assisted magnetic recording head element 4, a temperature distribution caused by the evanescent light 203 generated by the portion of light emission of evanescent light 2 can be obtained by detecting a thermal change of the probe 520 caused by the evanescent light when the probe 520 of the cantilever 500 becomes in contact with the evanescent light with the thermal sensor 601 installed on the surface of the cantilever 500 opposed to the probe 520 and processing the detection signal with the control unit PC 30. By comparing the obtained temperature distribution caused by the evanescent light 203 with preset reference data, it can be determined whether the state of generation of the evanescent light from the portion of light emission of evanescent light 2 is good or bad. Accordingly, inspection of the evanescent light generated by the thermally assisted magnetic recording head becomes possible and an advantageous effect arises that the intensity distribution of the evanescent light of the thermally assisted magnetic recording head can be inspected at a stage as early as possible in the course of manufacturing steps.

A procedure of operation of the thermally assisted magnetic recording head inspection apparatus 5000 in the present embodiment is the same as that shown in the flow chart of FIG. 9 explained in Embodiment 1.

Embodiment 4

A fourth embodiment of the present invention is explained in detail with reference to the drawings.

Figure 7:
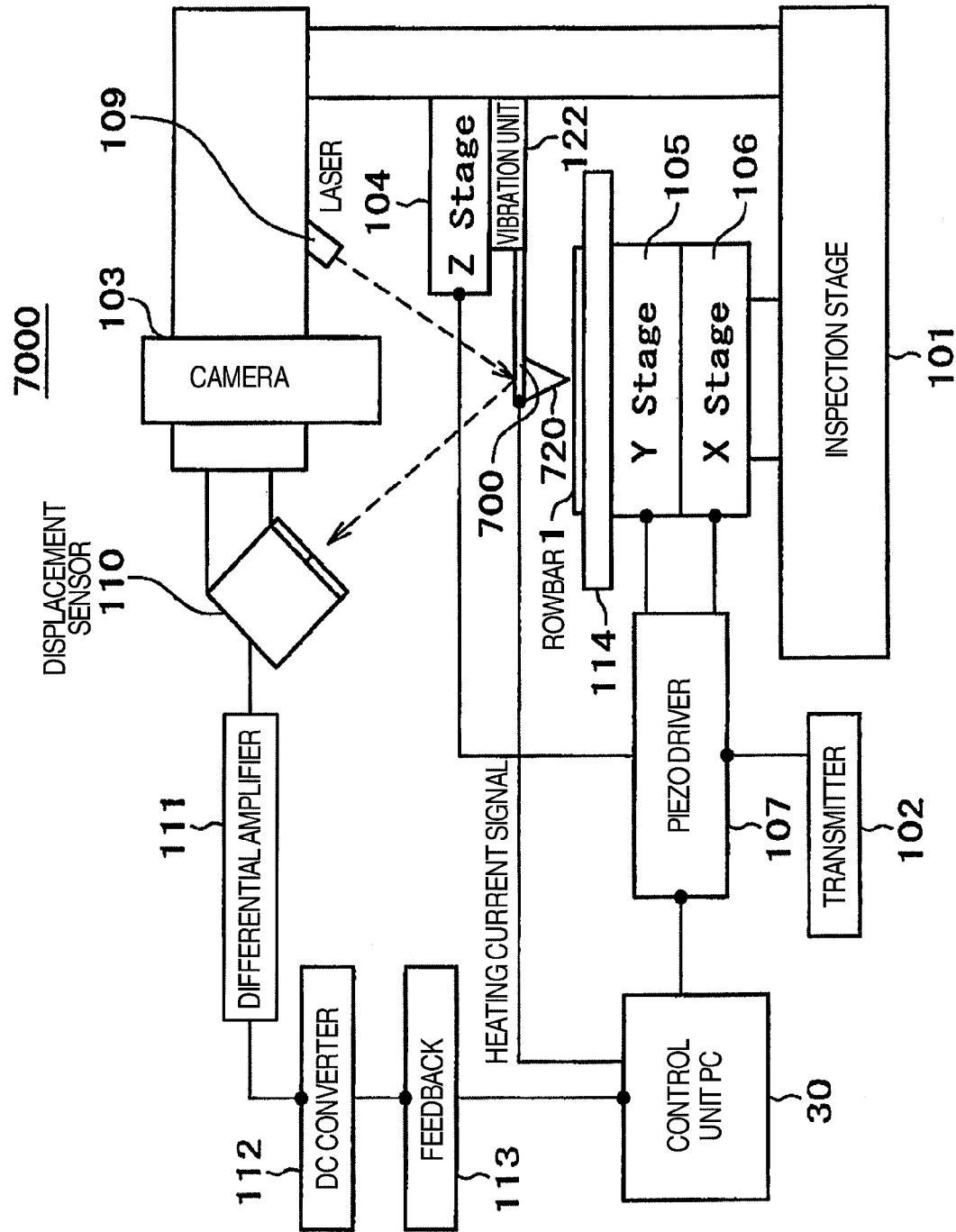
FIG. 7 is a block diagram showing a schematic arrangement of a fourth embodiment of a thermally assisted magnetic recording head inspection apparatus according to the present invention.

FIG. 7 is a block diagram of a basic configuration of a fourth embodiment of a thermally assisted magnetic recording head inspection apparatus according to the present invention. A thermally assisted magnetic recording head inspection apparatus 7000 of FIG. 7, like Embodiments 1 to 3, can measure the physical shape of a portion of light emission of evanescent light of a thermally assisted magnetic recording head element 4 in the form of a rowbar prior to individual sliders (chips) being cut out therefrom.

In the configuration of the thermally assisted magnetic recording head inspection apparatus 7000 of FIG. 7, the same constituents as those in the configuration of the thermally assisted magnetic recording head inspection apparatus 1000 explained for Embodiment 1 shown in FIG. 1 are denoted by the same reference numerals. As for the constituents overlapping with those explained in connection with the thermally assisted magnetic recording head inspection apparatus 1000 of Embodiment 1, such as the inspection stage 101, the piezo driver 107, the displacement detecting unit configured with the semiconductor laser element 109 and the displacement sensor 110, and the differential amplifier 111, explanation is omitted.

In the present embodiment it is different from the aforementioned Embodiments 1 to 3 that an area including the portion of light emission of evanescent light 2 is scanned while a probe 720 provided at the tip end portion of a cantilever 700 is heated to maintain at a constant temperature and the physical shape of the portion of light emission of evanescent light 2 is inspected based on a difference in heating condition caused by a difference in thermal conductivity.

A camera 103 for measurement of the amount of positional displacement is provided above the Y stage 105. The Z stage 104 is to move a cantilever portion 700 of a scanning thermal microscope (SThM) in the Z direction. The X stage 106, the Y stage 105, and the Z stage 104 of the inspection stage 101 are formed with piezo stages, respectively. After a predetermined positioning is completed, the rowbar 1 adheres to be held to the mounting portion 114.

The piezo driver 107 is to drive and control each of the X stage 106, the Y stage 105, and the Z stage 104 (piezo stages) of the inspection stage 101. The control unit PC 30 is configured with a computer for control with a personal computer (PC) including a display as a basic configuration. As illustrated in the figure, the cantilever portion 700 with a resistive wire at its tip end portion and with a sharp-pointed probe 720 being a free end is arranged at an opposing position above the rowbar 1 mounted on the Y stage 105 of the inspection stage 101. The control unit PC 30 supplies a heating current signal in order to cause the resistive wire of the cantilever portion 700 to heat up. The cantilever portion 700 is installed to the vibration unit 122 provided on the lower side of the Z stage 104. The vibration unit 122 is configured with a piezo element; an AC voltage having a frequency near a mechanical resonance frequency is applied as an exciting voltage from the piezo driver 107 so that the magnetic probe is vertically vibrated.

Figure 8:
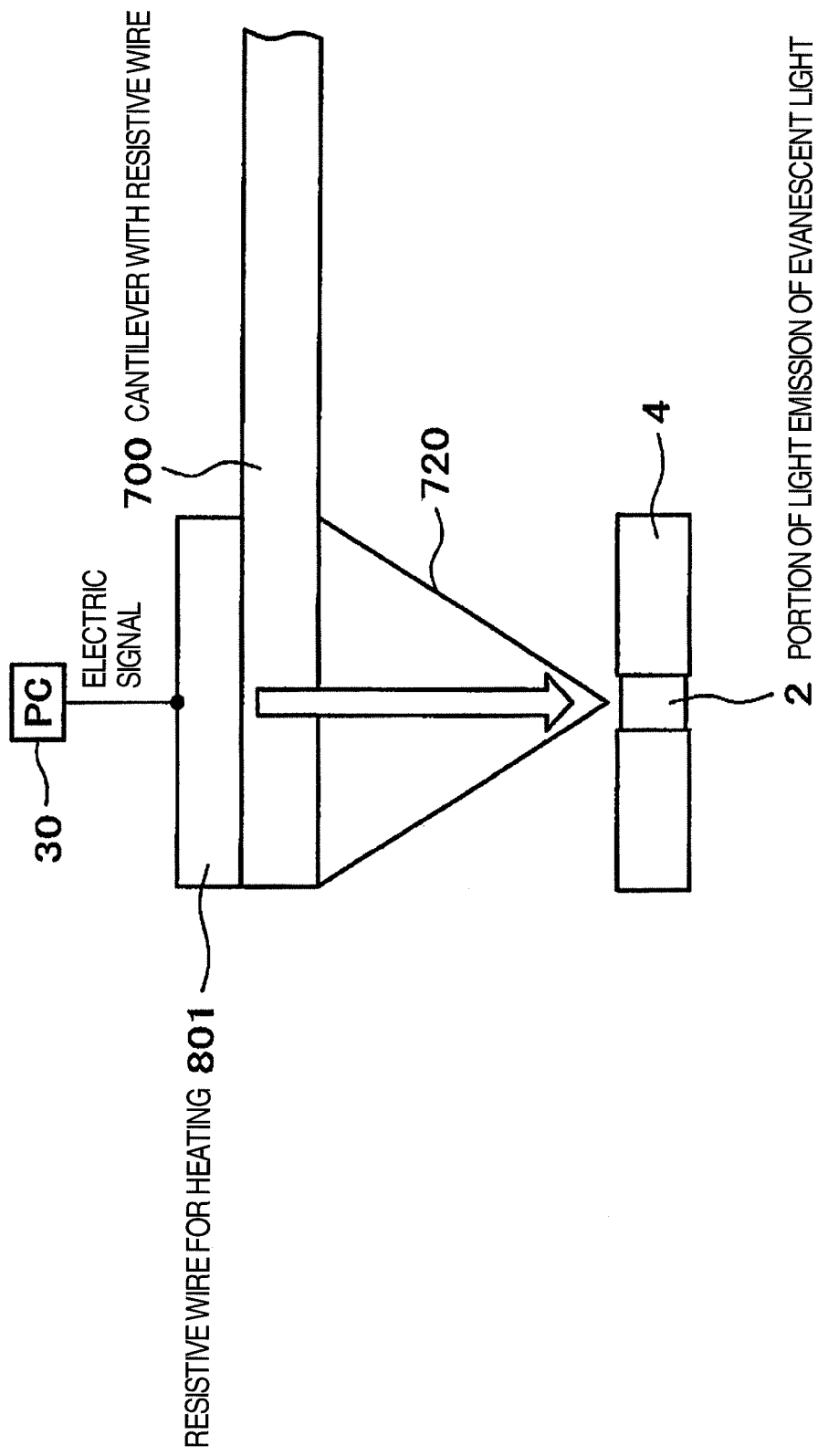
FIG. 8 is a side view of an enlargement of a probe provided at the tip end portion of a cantilever and a portion of generation of thermally assisted light of a recording head in the fourth embodiment of the thermally assisted magnetic recording head inspection apparatus according to the present invention.

FIG. 8 is a diagram schematically showing a principle of detecting the physical shape of the portion of light emission of evanescent light with the thermally assisted magnetic recording head inspection apparatus 7000 of FIG. 7, also showing an enlargement of a configuration of the portion of light emission of thermally assisted light (evanescent light) 2 of the thermally assisted magnetic recording head element 4 formed in the rowbar 1 along with the resistive-wire-added cantilever portion 700 to which a resistive wire 801 is added.

As shown in FIG. 8, the probe 720 added with the resistive wire 801 at the tip end portion of the cantilever portion 700 is positioned by the Z stage 104 so as to be in contact (tapping state) with the surface of the thermally assisted magnetic recording head element 4 formed in the rowbar 1. The cantilever portion 700 is scanned in a plane parallel to the recording surface of the head in the rowbar 1 within a range of several hundreds of nm to several μm. Here, by providing power to the resistive wire 801 the probe is heated up and heat is transferred to the head when the probe contacts with the surface of the portion of light emission of evanescent light 2 or other locations. In order to maintain the temperature of the probe constant, a current flowing through the resistive wire 801 always varies. Since this variation in current is related with how fast the heat of the probe is dissipated, that is, with the thermal conductivity of a substance in contact with the probe, a difference in thermal conductivity due to different structures on the surface of the thermally assisted magnetic recording head element 4, mainly differences in material, can be detected by a change in the current value; thus, by processing a detection signal indicative of a change in the current value with the control unit PC 30, a distribution of the quantity of heat transferred to the portion of light emission of evanescent light 2 can be obtained. By comparing the obtained distribution of the quantity of transferred heat with preset reference data, it can be determined whether the state of the portion of light emission of evanescent light 2 is good or bad. An advantageous effect arises that the physical shape of the portion of light emission of evanescent light 2 of the thermally assisted magnetic recording head element 4 can be inspected at a stage as early as possible in the course of manufacturing steps.

A procedure of operation of the thermally assisted magnetic recording head inspection apparatus 7000 according to the present embodiment is basically the same as the procedure explained using FIG. 10 in Embodiment 2; the step S1004 of irradiating laser to cause the tip end portion of the probe 120 to emit the evanescent light should be replaced with a step of passing a current through the resistive wire 801 to heat up the probe 720.

Embodiment 5

A fifth embodiment of the present invention is explained in detail by referring to the drawings.

Figure 11:
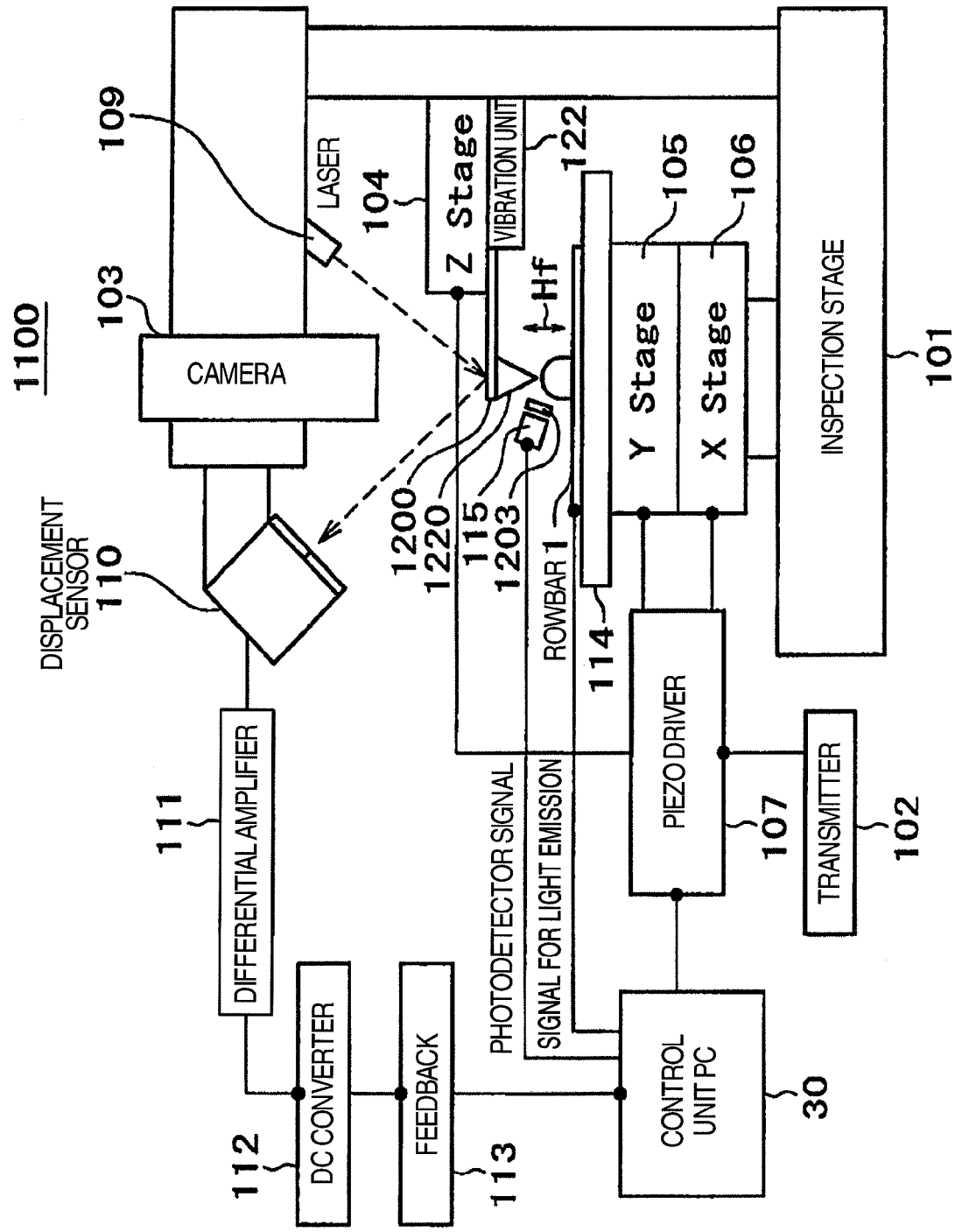
FIG. 11 is a block diagram showing a schematic arrangement of a fifth embodiment of a thermally assisted magnetic recording head inspection apparatus according to the present invention.

FIG. 11 is a block diagram of a basic configuration of a fifth embodiment of a thermally assisted magnetic recording head inspection apparatus according to the present invention. A thermally assisted magnetic recording head inspection apparatus 1100 of FIG. 11, like Embodiments 1 to 4, can measure the intensity distribution of evanescent light generated by the thermally assisted magnetic recording head in the form of a rowbar (a block with head sliders arranged therein) in a process prior to cutting out individual sliders (chips) therefrom.

In the configuration of the thermally assisted magnetic recording head inspection apparatus 1100 of FIG. 11, the same constituents as those in the configuration of the thermally assisted magnetic recording head inspection apparatus 1000 explained for Embodiment 1 shown in FIG. 1 are denoted by the same reference numerals. As for the constituents overlapping with those explained in connection with the thermally assisted magnetic recording head inspection apparatus 1000 of Embodiment 1, such as the inspection stage 101, the piezo driver 107, the displacement detecting unit configured with the semiconductor laser element 109 and the displacement sensor 110, and the differential amplifier 111, explanation is omitted.

In the present embodiment it is the same as the probe 120 explained in Embodiment 1 that a fine particle or a thin film 201 of a noble metal (such as gold or silver, for example) or of an alloy containing a noble metal is formed on the surface of a probe 1220 at the tip end of a cantilever 1200; in the present embodiment, however, it is different from Embodiment 1 that over a fine particle or a thin film 201 of a noble metal (such as gold or silver, for example) or of an alloy containing a noble metal formed is a fine particle or a thin film 1201 of a material which can convert wavelength of light (for example, luminescence material (for example, a ceramic material doped with rare earth ions therein, a complex chloride material of rare earth element and barium, or the like), a material capable of generating harmonics (for example, paranitroaniline (pNA), PDA (poly diallymethylammonium) nano crystals, or the like), or a material capable of generating Raman scattering (for example, organic nano crystals such as adenine nano crystals or azobenzene nano crystals, biomolecules, semiconductor, or the like)).

A camera 103 for measurement of the amount of positional displacement is provided above the Y stage 105. The Z stage 104 is to move the cantilever portion 100 of a scanning near field optical microscope (SNOM) in the Z direction. The X stage 106, the Y stage 105, and the Z stage 104 of the inspection stage 101 are formed with piezo stages, respectively. After a predetermined positioning is completed, the rowbar 1 is provided with a recording signal (a signal for light emission) output from the control unit PC 30 or with laser light for excitation directly so that the rowbar 1 adheres to be held to the mounting portion 114 with the portion of light emission of evanescent light of the thermally assisted magnetic recording head ready to emit light.

The piezo driver 107 is to drive and control each of the X stage 106, the Y stage 105, and the Z stage 104 (piezo stages) of the inspection stage 101. The control unit PC 30 is configured with a computer for control with a personal computer (PC) including a display as a basic configuration. As illustrated in the figure, at an opposing position above the rowbar 1 mounted on the mounting portion on the Y stage 105 of the inspection stage 101 the cantilever portion 1200 with a sharp-pointed probe being a free end, is arranged to which a fine particle or a thin film, a reflected light on which has a different wavelength of an irradiating light when the light is irradiated, namely, those of a material which can convert wavelength of light (for example, luminescence material or a material capable of generating harmonics or Raman scattering) is added or to which a fine particle or a thin film of a noble metal (such as gold or silver, for example) or of an alloy containing a noble metal is added first and then a fine particle or a thin film of the material capable of converting the wavelength of light as described above is added. The cantilever portion 1200 is installed to the vibration unit 122 provided on the lower side of the Z stage 104. The vibration unit 122 is configured with a piezo element; an AC voltage having a frequency near a mechanical resonance frequency is applied as an exciting voltage from the piezo driver 107 so that the magnetic probe is vertically vibrated.

FIG. 12 is a diagram schematically showing a principle of detecting evanescent light with the thermally assisted magnetic recording head inspection apparatus 1100 of FIG. 11; it is a diagram showing an enlargement of a configuration of a portion of light emission of thermally assisted light (evanescent light) 2 of a thermally assisted magnetic recording head element 4 formed in a rowbar 1 along with the cantilever portion 1200.

As shown in FIG. 12, the cantilever portion 1200 is positioned by the Z stage 104 so that the tip end portion of a probe 1220 of the cantilever portion 1200 is located between a position in contact with the surface of the thermally assisted magnetic recording head element 4 formed in the rowbar 1 and a position (height) several tens of nm away and at such a height that a magnetic field signal and a detection signal of the evanescent light from the thermally assisted magnetic recording head element 4 can be detected at greatest strengths. The cantilever portion 1200 is scanned in a plane parallel to the recording surface of the thermally assisted magnetic recording head element 4 in the rowbar 1 within a range of several hundreds of nm to several μm. Here, the thermally assisted magnetic recording head element 4 is supplied with a recording signal (a signal for light emission) output from the control unit PC 30 of FIG. 11 or laser light for excitation directly so that thermally assisted light (evanescent light) 203 is emitted by the portion of light emission of evanescent light 2 of the thermally assisted magnetic recording head element 4. In the present embodiment, the probe 1220 has on its surface either a configuration in which a fine particle or a thin film 1221 is formed of a material capable of emitting reflected or transmitted light having a wavelength different from that of incident light, that is, a material capable of converting wavelength of light (for example, luminescence material or a material capable of generating harmonics or Raman scattering) or a configuration in which a fine particle or a thin film 201 of a noble material (such as gold or silver, for example) or of an alloy containing a noble metal is formed first and then a fine particle or a thin film 1221 of the material capable of converting the wavelength of light as described above is added. In the case of FIG. 12, a configuration is shown in which a fine particle or a thin film 201 of a noble metal or of an alloy containing a noble metal is formed first and then a fine particle or a thin film 1221 of a material capable of converting the wavelength of light is formed over it.

When the probe 1220 having the aforementioned configuration enters a region where the thermally assisted light (evanescent light) 203 is generated, scattered light is created from the fine particle or the thin film 201 of the alloy containing the noble metal formed on the surface of the probe 1220 due to the thermally assisted light (evanescent light) 203. The scattered light enters, are reflected, or are transmitted into the fine particle or the thin film 1221 of material which can convert the wavelength of light such as a luminescence material and a scattered light 1204 of a wavelength different from the wavelength of the incident scattered light is emitted.

Part of the emitted scattered light 1204 is transmitted through a dichroic mirror 1203, which allows transmission of light having a specific wavelength or a wavelength range therethrough, and detected by the photodetector 115. Now, by setting the wavelength range of transmission so that the dichroic mirror 1203 passes the scattered light 1204 therethrough and reflects the thermally assisted light (evanescent light) 203, the scattered light 1204 can be detected by the photodetector 115.

Since the scattered light 1204 is proportional in the intensity to the evanescent light 203, by processing a detection signal of the scattered light 1204 detected by the detector 115 with the control unit PC 30 an intensity distribution of the evanescent light 203 generated from the portion of light emission of evanescent light 2 can be obtained (estimated). By comparing the obtained intensity distribution of the evanescent light with preset reference data, it can be determined whether the state of light emission of the evanescent light from the portion of light emission of evanescent light 2 is good or bad. In this manner, effective inspection of the evanescent light generated by the recording head of the thermally assisted magnetic recording head becomes possible and an advantageous effect arises that the intensity distribution of the evanescent light of the thermally assisted magnetic recording head can be inspected at a stage as early as possible in the course of manufacturing steps.

A procedure of operation of the thermally assisted magnetic recording head inspection apparatus 1100 according to the present embodiment is the same as the procedure explained in Embodiment 1 using FIG. 9.

In the above embodiment, incidentally, explanation has been made in connection with inspection in the form of the rowbar 1; however, the present embodiment is not limited thereto and inspection similar to the one described above may be carried out with individual sliders (not shown) cut out from the rowbar 1 being mounted on the mounting portion 114.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description and all changes which come within the meaning and range of equivalency of the claims are therefore intended to be embraced therein.

The invention claimed is:

1. An inspection apparatus for inspecting a thermally assisted magnetic recording head element, comprising:
    a table unit movable in a plane having a thermally assisted magnetic recording head element as a specimen mounted thereon;
    a cantilever comprising a probe for scanning a surface of the specimen mounted on the table unit;
    a vibration driving unit for vibrating the cantilever vertically with respect to the surface of the specimen;
    a displacement detecting unit for detecting vibration of the cantilever by irradiating light onto a surface of the cantilever vibrated by the vibration driving unit which is opposed to a surface of the cantilever comprising the probe and by detecting light reflected from the cantilever;
    a signal output unit for outputting a signal to generate evanescent light from a portion of light emission of evanescent light of the thermally assisted magnetic recording head element;
    a scattered light detecting unit for detecting scattered light generated from a surface of the cantilever when the probe of the cantilever enters a region of emission of evanescent light generated from the portion of light emission of evanescent light of the thermally assisted magnetic recording head element by a signal output from the signal output unit; and
    a processing unit for determining whether a state of generation of evanescent light generated from the portion of light emission of evanescent light of the thermally assisted magnetic recording head element is good or bad using position information of the table unit having the specimen mounted thereon and a signal obtained by detecting the scattered light with the scattered light detecting unit.

2. An inspection apparatus for inspecting a thermally assisted magnetic recording head element according to claim 1,
    further comprising a fine particle or a thin film of a noble metal or of an alloy containing a noble metal formed on a surface of the probe of the cantilever,
    wherein the scattered light detecting unit detects scattered light generated from the fine particle or the thin film of a noble metal or of an alloy containing a noble metal formed on the surface of the probe when the probe of the cantilever enters a region of emission of the evanescent light.

3. An inspection apparatus for inspecting a thermally assisted magnetic recording head element according to claim 1,
    further comprising a fine particle or a thin film of a material for converting a wavelength of incident light and emitting wavelength-converted light formed on a surface of the probe of the cantilever,
    wherein first scattered light generated from a surface of the probe when the probe of the cantilever enters a region of emission of the evanescent light is converted to and emitted as second scattered light having a wavelength different from a wavelength of the evanescent light via the fine particle or the thin film of the material for converting a wavelength of incident light and emitting wavelength-converted light, wherein the scattered light detecting unit detects the second scattered light having the wavelength different from the wavelength of the evanescent light being emitted.

4. An inspection apparatus for inspecting a thermally assisted magnetic recording head element according to claim 1, further comprising:
a first fine particle or a first thin film of a noble metal or of an alloy containing a noble metal formed on a surface of the probe of the cantilever; and
a second fine particle or a second thin film of a material for converting a wavelength of incident light and emitting wavelength-converted light formed on the first fine particle or the first thin film of a noble metal or of an alloy containing a noble metal,
wherein first scattered light generated from the first fine particle or the first thin film of a noble metal or of an alloy containing a noble metal formed on the surface of the probe of the cantilever when the probe of the cantilever enters a region of emission of the evanescent light is converted to and emitted as second scattered light having a wavelength different from a wavelength of the evanescent light via the second fine particle or the second thin film of the material for converting a wavelength of incident light and emitting wavelength-converted light,
wherein the scattered light detecting unit detects the second scattered light being emitted.

5. An inspection apparatus for inspecting a thermally assisted magnetic recording head element according to claim 1, wherein the cantilever is one of various cantilevers commercially available such as one having the probe made of silicon (Si), silicon oxide (SiO$_2$), or silicon nitride (SiN) per se or a conventional AFM cantilever having a thin wire made of a material of high-density carbon (HDC:DLC), CNT, CNF, or W (tungsten) at a tip end portion thereof.

6. An inspection apparatus for inspecting a thermally assisted magnetic recording head element, comprising:
a table unit movable in a plane having a thermally assisted magnetic recording head element as a specimen mounted thereon;
a cantilever comprising a probe for scanning a surface of the specimen mounted on the table unit, a fine particle or a thin film of a noble metal or of an alloy containing a noble metal being formed on a surface of the probe;
a vibration driving unit for vibrating the cantilever vertically with respect to the surface of the specimen;
a displacement detecting unit for detecting vibration of the cantilever by irradiating light onto a surface of the cantilever vibrated by the vibration driving unit which is opposed to a surface of the cantilever comprising the probe and by detecting light reflected from the cantilever;
an evanescent light generating unit for irradiating a tip end portion of the cantilever with laser light to generate evanescent light from the fine particle or the thin film of a noble metal or of an alloy containing a noble metal formed on a surface of the probe;
a scattered light detecting unit for detecting scattered light generated from the thermally assisted magnetic recording head element when the probe vibrated by the vibration driving unit and generating evanescent light by the evanescent light generating unit approaches the thermally assisted magnetic recording head element; and
a processing unit for processing a signal obtained by being detected by the displacement detecting unit and a signal obtained by detecting the scattered light with the scattered light detecting unit and for inspecting a state of generation of evanescent light generated from the thermally assisted magnetic recording head element.

7. A method for inspecting a thermally assisted magnetic recording head element, comprising the steps of:
mounting a thermally assisted magnetic recording head element as a specimen on a table movable in a plane of a scanning probe microscope device;
generating evanescent light from a portion of light emission of evanescent light of the specimen;
detecting scattered light of the evanescent light generated from the thermally assisted magnetic recording head element by moving the table in the plane while a cantilever of the scanning probe microscope device having a probe is vertically vibrated in a vicinity of a surface of the specimen; and
inspecting an intensity distribution of the evanescent light emitted from the portion of light emission of evanescent light or a surface profile of the portion of light emission of evanescent light of the thermally assisted magnetic recording head element formed in a rowbar using position information of generation of the evanescent light based on the scattered light detected.

8. A method for inspecting a thermally assisted magnetic recording head element according to claim 7, wherein a fine particle or a thin film of a noble metal or of an alloy containing a noble metal is formed on a surface of the probe of the cantilever, and wherein the step of inspecting an intensity distribution of the evanescent light emitted from the portion of light emission of evanescent light or a surface profile of the portion of light emission of evanescent light comprises the step of detecting scattered light generated from the fine particle or the thin film of a noble metal or of an alloy containing a noble metal formed on the surface of the probe when the probe of the cantilever enters a region of generation of the evanescent light.

9. A method for inspecting a thermally assisted magnetic recording head element according to claim 7, wherein a fine particle or a thin film of a material for converting a wavelength of incident light and emitting wavelength-converted light is formed on a surface of the probe of the cantilever, and wherein the step of inspecting an intensity distribution of the evanescent light emitted from the portion of light emission of evanescent light or a surface profile of the portion of light emission of evanescent light comprises the step of detecting second scattered light having a wavelength different the wavelength of the evanescent light, the second scattered light being converted from first scattered light generated from a surface of the probe when the probe of the cantilever enters a region of emission of the evanescent light via the fine particle or the thin film of the material for converting a wavelength of incident light and emitting wavelength-converted light.

10. A method for inspecting a thermally assisted magnetic recording head element according to claim 7, wherein a first fine particle or a first thin film of a noble metal or of an alloy containing a noble metal is formed on a surface of the probe of the cantilever, wherein a second fine particle or a second thin film of a material for converting a wavelength of incident light and emitting wavelength-converted light is formed on the first fine particle or the first thin film of a noble metal or of an alloy containing a noble metal, and wherein the step of inspecting an intensity distribution of the evanescent light emitted from the portion of light emission of evanescent light or a surface profile of the portion of light emission of evanescent light comprises the step of detecting second scattered light having a wavelength different from the wavelength of the evanescent light, the second scattered light being converted from first scattered light generated from a surface of the probe when the probe of the cantilever enters a region of emission of the evanescent light via the second fine particles or the second thin of the material for converting a wavelength of incident light and emitting wavelength-converted light.

11. A method for inspecting a thermally assisted magnetic recording head element according to claim 7, wherein the cantilever is one of various cantilevers commercially available such as one having the probe made of silicon (Si), silicon oxide ($SiO_2$), or silicon nitride (SiN) per se or a conventional AFM cantilever having a thin wire made of a material of high-density carbon (HDC:DLC), CNT, CNF, or W (tungsten) at a tip end portion thereof.

* * * * *

UNITED STATES PATENT AND TRADEMARK OFFICE
CERTIFICATE OF CORRECTION

PATENT NO. : 8,483,035 B2
APPLICATION NO. : 13/482065
DATED : July 9, 2013
INVENTOR(S) : Kaifeng Zhang et al.

It is certified that error appears in the above-identified patent and that said Letters Patent is hereby corrected as shown below:

On the title page under item (30) add the following:

-- May 22, 2012  (JP) ................... 2012-116362 --

Signed and Sealed this
Fifteenth Day of October, 2013

Teresa Stanek Rea
*Deputy Director of the United States Patent and Trademark Office*